(12) United States Patent
Naito

(10) Patent No.: US 9,721,732 B2
(45) Date of Patent: Aug. 1, 2017

(54) SOLID ELECTROLYTIC CAPACITOR, AND PRODUCTION METHOD THEREOF

(71) Applicant: SHOWA DENKO K.K., Tokyo (JP)

(72) Inventor: Kazumi Naito, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 5 days.

(21) Appl. No.: 14/780,095

(22) PCT Filed: Jun. 5, 2014

(86) PCT No.: PCT/JP2014/064923
§ 371 (c)(1),
(2) Date: Sep. 25, 2015

(87) PCT Pub. No.: WO2014/196588
PCT Pub. Date: Dec. 11, 2014

(65) Prior Publication Data
US 2016/0049259 A1    Feb. 18, 2016

(30) Foreign Application Priority Data

Jun. 6, 2013 (JP) .................................. 2013-119555

(51) Int. Cl.
| | |
|---|---|
| *H01G 9/00* | (2006.01) |
| *H01G 9/15* | (2006.01) |
| *H01G 9/012* | (2006.01) |
| *H01G 9/08* | (2006.01) |
| *H01G 9/06* | (2006.01) |
| *H01G 9/10* | (2006.01) |

(52) U.S. Cl.
CPC ............... *H01G 9/15* (2013.01); *H01G 9/012* (2013.01); *H01G 9/06* (2013.01); *H01G 9/10* (2013.01); *H01G 9/0029* (2013.01); *H01G 9/08* (2013.01)

(58) Field of Classification Search
CPC .............................. H01G 9/012; H01G 9/022
See application file for complete search history.

(56) References Cited

FOREIGN PATENT DOCUMENTS

| | | |
|---|---|---|
| JP | H08148386 A | 6/1996 |
| JP | 2001-52961 A | 2/2001 |

(Continued)

OTHER PUBLICATIONS

International Search Report from PCT Application No. PCT/JP2014/064923 dated Sep. 9, 2014.

*Primary Examiner* — Seahvosh Nikmanesh
(74) *Attorney, Agent, or Firm* — Millen, White, Zelano & Branigan, P.C.; William Nixon

(57) ABSTRACT

A production method efficiently produces a box sealed type solid electrolytic capacitor in which a capacitor element is accommodated in a box-shaped case. The method includes a step of preparing a bottom wall substrate having bottom walls. A step forms cathode anode circuit patterns on the bottom wall substrate. A step prepares a peripheral side wall substrate having peripheral side walls. A step prepares a peripheral side wall substrate in which a plurality of through-holes are provided that correspond to plurality of bottom wall structural portions. A step fixes a capacitor element to each bottom wall structural portion of the bottom wall substrate. A step obtains a capacitor continuous member in which a plurality of capacitor structural portions structuring a solid electrolytic capacitor by attaching an upper lid substrate on the peripheral side wall substrate. A step obtains a plurality of solid electrolytic capacitors by cutting the capacitor continuous member.

7 Claims, 10 Drawing Sheets

(56) References Cited

FOREIGN PATENT DOCUMENTS

| JP | 2004-349658 | A | 12/2004 |
|----|-------------|----|---------|
| JP | 2006-278875 | A | 10/2006 |
| JP | 4879845 | B2 | 2/2012 |
| JP | 2012-222344 | A | 11/2012 |

SOLID ELECTROLYTIC CAPACITOR, AND PRODUCTION METHOD THEREOF

TECHNICAL FIELD

The present invention relates to a solid electrolytic capacitor in which a capacitor element is sealed by a box-shaped case and its production method.

BACKGROUND TECHNIQUE

Conventionally, as solid electrolytic capacitors, a resin mold sealed type solid electrolytic capacitor in which a capacitor element is sealed by molding or a box sealed type solid electrolytic capacitor in which a capacitor element is sealed by a box-shaped case are well known.

For example, as shown in Patent Document 1 listed below, in the box sealed type solid electrolytic capacitor, in a state in which a capacitor element is accommodated inside a case main body having a bottom wall and peripheral side walls provided at peripheral four sides (outer peripheral edge portions) of the bottom wall, an upper opening of the case main body is closed in a sealed manner by an upper lid.

PRIOR ART DOCUMENTS

Patent Document

[Patent Document 1] Japanese Patent No. 4879845

DISCLOSURE OF THE INVENTION

Problems to be Solved by the Invention

In the meantime, in producing the aforementioned conventional box sealed type solid electrolytic capacitor, there required many steps, such as, e.g., a step of forming an anode circuit pattern and a cathode circuit pattern at predetermined positions on the inner surface and the outer surface of the bottom wall of the case main body, respectively, a step of making corresponding circuit patterns on the inner surface and the outer surface of the bottom wall of the case main body electrically conductive, a step of accommodating the capacitor element in the case main body and electrically and mechanically connecting predetermined portions thereof, a step of attaching an upper lid to the upper opening section of the case main body, etc. Thus, the production was difficult, and it was difficult to attain high production efficiency. Especially, in the case of a small box sealed type solid electrolytic capacitor having a size in the order of several millimeters, it is necessary to perform a large number of very fine and dense works, resulting in more difficult production, which further deteriorates the production efficiency.

For this reason, in the technical field of a box sealed type solid electrolytic capacitor, development of techniques capable of efficiently producing such capacitor is desired.

The present invention was made in view of the aforementioned problems, and aims to provide a box sealed type solid electrolytic capacitor capable of being efficiently produced and its production method.

Other purposes and advantages of the present invention will be apparent from the following embodiments.

Means for Solving the Problems

In order to attain the aforementioned purposes, the present invention can be summarized as having the following structure.

[1] A production method of a solid electrolytic capacitor for producing a box sealed type solid electrolytic capacitor equipped with a box-shaped case in which a peripheral side wall formed on an outer peripheral edge portion of an inner surface of a bottom wall and an upper opening section of the peripheral side wall is closed by an upper lid and a capacitor element accommodated inside the box-shaped case.

The method includes:

a step of preparing a bottom wall substrate in which a plurality of bottom wall structural portions capable of constituting the bottom wall are provided continuously;

a step of forming inner cathode anode circuit patterns and outer cathode anode circuit patterns on an inner surface and an outer surface of each bottom wall structural portion of the bottom wall substrate, respectively, and electrically connecting the inner cathode anode circuit patterns and the outer cathode anode circuit patterns;

a step of preparing a peripheral side wall substrate provided with a plurality of through-holes in an arrangement corresponding to the plurality of bottom wall structural portions;

a step of attaching the peripheral side wall substrate to an inner surface of the bottom wall substrate so that the inner cathode anode circuit patterns of each bottom wall structural portion of the bottom wall substrate are respectively arranged in each through-hole of the peripheral side wall substrate;

a step of preparing, as the capacitor element, a capacitor element in which an anode part is constituted by an anode lead protruded from a front end forward and a cathode part is provided on at least lower surface;

a step of fixing the capacitor element to an inner surface of each bottom wall structural portion of the bottom wall substrate and electrically connecting cathode anode parts of each capacitor element to the inner cathode anode circuit patterns of each bottom wall structural portion;

a step of obtaining a capacitor continuous member in which a plurality of capacitor structural portions capable of constituting the solid electrolytic capacitor are provided continuously by attaching an upper lid substrate on the peripheral side wall substrate so as to close the upper opening section of each through-hole of the peripheral side wall substrate; and a step of obtaining a plurality of solid electrolytic capacitors by cutting the capacitor continuous member every each capacitor structural portion.

[2] The production method of a solid electrolytic capacitor as recited in the aforementioned [1], wherein, in connecting an anode lead of the capacitor element to an inner anode circuit pattern, a conductive bolster member is previously attached to the inner anode circuit pattern and then the anode lead of the capacitor element is connected to the bolster member.

[3] The production method of a solid electrolytic capacitor as recited in the aforementioned item [1] or [2], wherein in attaching the upper lid substrate to the peripheral side wall substrate, an adhesive agent is previously applied to an upper surface of the capacitor element or a lower surface of the upper lid substrate, and then the adhesive agent is filled in between the upper lid substrate and the capacitor element.

[4] The production method of a solid electrolytic capacitor as recited in any one of the aforementioned Items [1] to [3], wherein, as the capacitor element, a capacitor element using tungsten for an anode is used.

[5] The production method of a solid electrolytic capacitor as recited in any one of the aforementioned items [1] to

[4], further comprising a step of performing aging processing to each capacitor element of the capacitor continuous member, wherein the aging processing is performed by connecting an outer cathode circuit pattern of a front side capacitor structural portion and an outer anode circuit pattern of a rear side capacitor structural portion in capacitor structural portions adjacent in a front and back direction, and energizing a plurality of capacitor elements arranged in the front and back direction in series by supplying current from a power source to the outer anode circuit pattern of a front end capacitor structural portion among a plurality of capacitor structural portions arranged in the front and back direction and returning the current from an outer cathode circuit pattern of a rear end capacitor element to the power source, and wherein one current controlling current control means is provided to a plurality of capacitor elements arranged in series and a voltage controlling voltage control means is provided to each capacitor element.

[6] The production method of a solid electrolytic capacitor as recited in the aforementioned item [5], wherein, in forming outer cathode anode circuit patterns on the bottom wall substrate, an outer cathode circuit pattern of a front side capacitor structural portion and an outer anode circuit pattern of a rear side capacitor structural portion, among capacitor structural portions of the capacitor continuous member adjacent in the front and rear direction, are formed continuously.

[7] A solid electrolytic capacitor produced by the production method as recited in any one of the aforementioned items [1] to [6], wherein outer peripheral end faces of the bottom wall, the peripheral side wall, and the upper lid are constituted by cut surfaces.

Effects of the Invention

According to the production method of the solid electrolytic capacitor of the invention [1], after producing the capacitor continuous member in which a number of capacitor structural portions each capable of structuring a box sealed type solid electrolytic capacitor are provided continuously, the capacitor continuous member is divided into each capacitor structural portion to thereby obtain a solid electrolytic capacitor. Therefore, a number of solid electrolytic capacitors can be produced at a time, which can improve the production efficiency.

According to the production method of the solid electrolytic capacitor of the invention [2], the anode lead as a lead wire of the solid electrolytic capacitor element can be assuredly connected to the inner anode circuit pattern in a stable manner.

According to the production method of the solid electrolytic capacitor of the invention [3], a solid electrolytic capacitor which does not cause defects such that the upper lid becomes dented or swelled can be produced.

According to the production method of the solid electrolytic capacitor of the invention [4], a solid electrolytic capacitor small in volume and large in capacity, i.e., small in size and high in performance, can be produced.

According to the production method of the solid electrolytic capacitor of the invention [5], the aging processing is performed by energizing a plurality of capacitor elements arranged in series in the front-back direction in a state of the capacitor continuous member before being divided into individual capacitors. Therefore, the aging processing can be performed efficiently.

According to the production method of the solid electrolytic capacitor of the invention [6], the capacitor elements are electrically connected beforehand between the capacitor structural portions arranged adjacently in the front-back direction, and therefore it is not required to perform electric wiring at the aging processing. This enables efficient aging processing.

According to the solid electrolytic capacitor of the invention [7], in the same manner as the inventions [1] to [6], the solid electrolytic capacitor can be produced efficiently.

EMBODIMENT FOR CARRYING OUT THE INVENTION

Hereinafter, a production method of a solid electrolytic capacitor according to an embodiment of the present invention will be explained with reference to the attached drawings. Initially, the structure of the solid electrolytic capacitor to be produced by the production method according to this embodiment will be explained.

Figure 1:
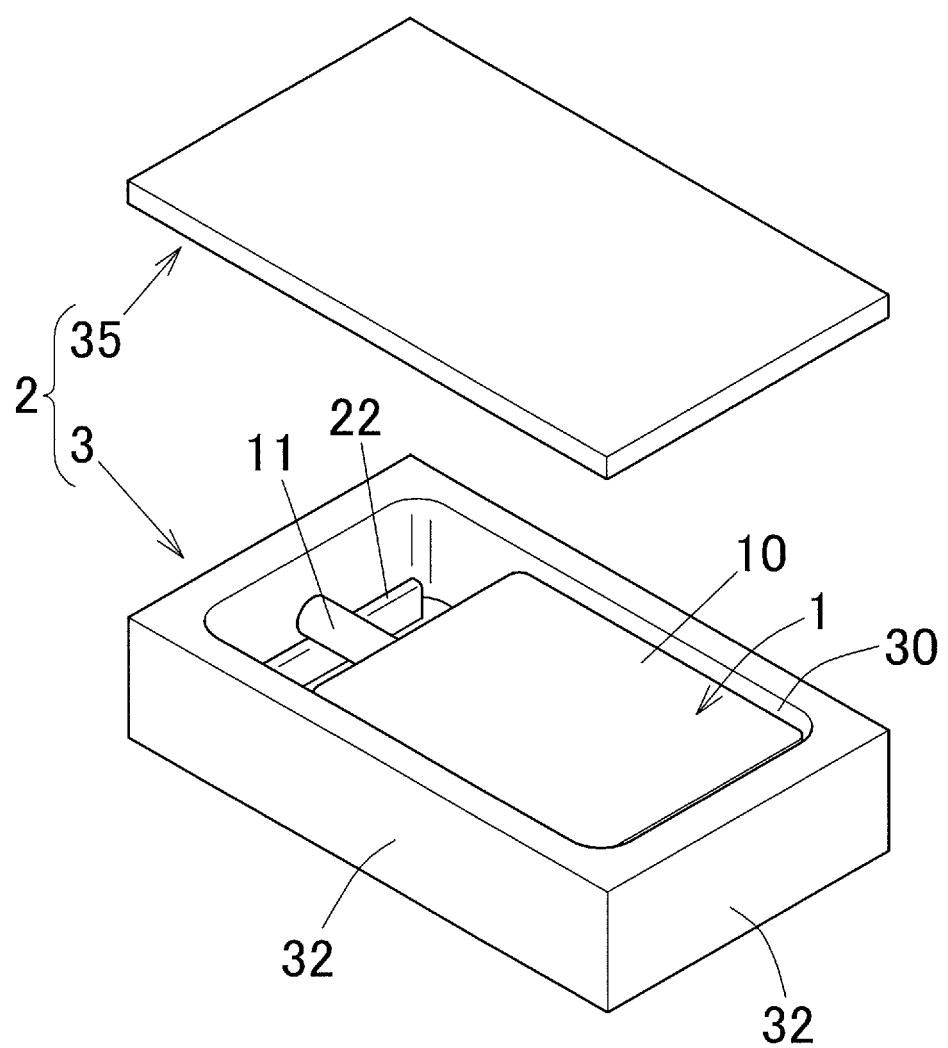
FIG. 1 is a perspective view showing a solid electrolytic capacitor produced by a production method according to an embodiment of the present invention in a state in which an upper lid is removed.
Figure 2:
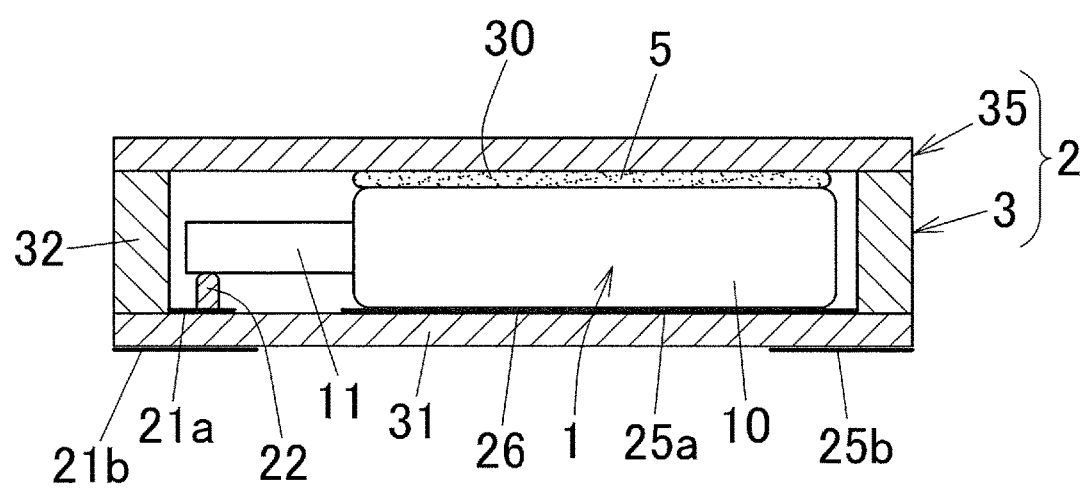
FIG. 2 is a side cross-sectional view showing the solid electrolytic capacitor according to the embodiment.
Figure 3A:
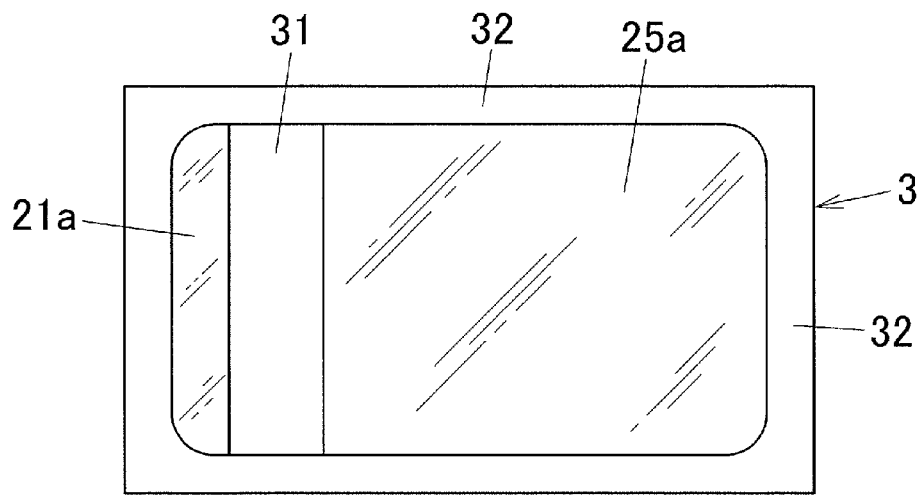
FIG. 3A is a top view showing a case main body of the solid electrolytic capacitor according to the embodiment.
Figure 3B:
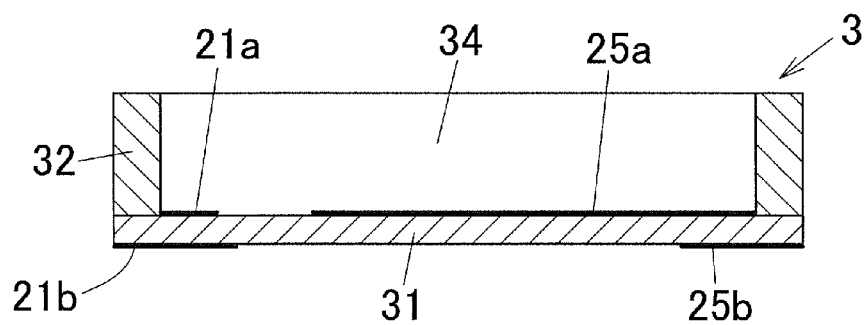
FIG. 3B is a side cross-sectional view showing a case main body of the solid electrolytic capacitor according to the embodiment.
Figure 3C:
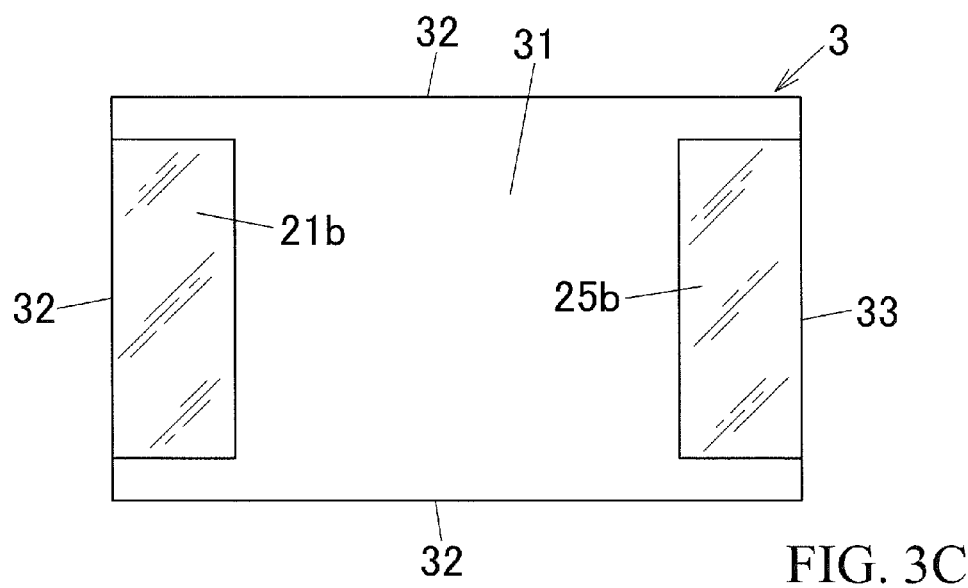
FIG. 3C is a bottom view showing the case main body of the solid electrolytic capacitor according to the embodiment.

FIG. 1 is a perspective view showing a solid electrolytic capacitor produced by a production method according to an embodiment of the present invention in a state in which an upper lid is removed. FIG. 2 is a side cross-sectional view of the solid electrolytic capacitor. FIG. 3 is a view showing a case main body of the solid electrolytic capacitor. For an easy understanding of the present invention, in this specification, the following explanation will be made by defining, when seen toward the plane of paper of FIG. 2, the left side (left hand) as a "front side (front hand)," the right side (right hand) as a "rear side (rear hand)," and the upper and lower direction as an "upper and lower direction," the upper and lower direction toward the plane of paper of FIG. 3A as a "left and right (width direction)."

As shown in these figures, the solid electrolytic capacitor to be produced by the production method of this embodiment is equipped with a rectangular parallelepiped box-shaped case 2 and a capacitor element 1 accommodated in this case 2 as fundamental structural elements.

In this embodiment, the capacitor element 1 is equipped with a linear-shaped anode lead 11 provided at its front end face so as to protrude forward, and is configured to constitute such that the anode lead 11 functions as an anode (anode part), and five faces (upper face, lower face, both side faces, and rear end face) of the capacitor element except for the front end face having the anode lead 11 function as a cathode. In this embodiment, a cathode anode part will be collectively referred to as an anode lead (anode part) 11 and a cathode part 10.

The box-shaped case 2 is provided with a case main body 3 having a concave cross-section and an upper lid 35 to be arranged in the upper opening of the case main body 3.

The case main body 3 is equipped with a bottom wall 31 of a rectangular shape in planar view and a peripheral side wall 32 formed on the peripheral four sides of the bottom wall 31 in a raising manner. The peripheral side wall 32 is constituted by a front wall, a rear wall and both side walls.

On the upper surface side (inner surface side) of the bottom wall 31 of the case main body 3, an inner anode circuit pattern 21a and an inner cathode circuit pattern 25a are formed. In this embodiment, inner cathode anode circuit patterns denote an inner anode circuit pattern 21a and an inner cathode circuit pattern 25a.

The inner anode circuit pattern 21a is formed at a position corresponding to the anode lead 11 of the capacitor element 1 to be accommodated in the case main body 3 so as to continuously extend in a width direction of the capacitor element 1. Further, the inner cathode circuit pattern 25a is formed at a position approximately corresponding to the entire lower surface portion of the capacitor element 1 to be accommodated.

Further, on the lower surface (outer surface) of the bottom wall 31 of the case main body 3, an outer anode circuit pattern 21b and an outer cathode circuit pattern 25b are formed. In this embodiment, outer cathode anode circuit patterns denote an outer anode circuit pattern 21b and an outer cathode circuit pattern 25b.

The outer anode circuit pattern 21b is formed at the front end section of the lower surface of the bottom wall 31 so as to continuously extend in the width direction. Further, the outer cathode circuit pattern 25b is formed at the rear end section of the lower surface of the bottom wall 31 so as to continuously extend in the width direction.

Further, the anode lead 11 of the capacitor element 1 is electrically connected to the inner anode circuit pattern 21a.

In cases where the anode lead 11 and the anode circuit pattern 21a are spatially distanced, the anode lead 11 can be electrically connected to the anode circuit pattern 21a via a conductive auxiliary member made of, e.g., a metal member (hereinafter referred to as "bolster member 22").

FIGS. 1 and 2 illustrate an embodiment in which a conductive bolster member 22 made of, e.g., a metal material is electrically and mechanically connected to the inner anode circuit pattern 21a of the case main body 3.

The inner anode circuit pattern 21a and the outer anode circuit pattern 21b are electrically conducted via a through-hole (not illustrated) in which a conductive layer is formed on its inner peripheral surface. Further, the inner cathode circuit pattern 25a and the outer cathode circuit pattern 25b are conducted via a similar through-hole (not illustrated). It is enough that at least one through-hole is provided between the inner and outer circuit patterns of the cathode and anode, but a plurality of through-holes can be provided.

In this case main body 3, the capacitor element 1 is accommodated. At this time, the lower surface side of the cathode part 10 of the capacitor element 1 is electrically and mechanically connected to the inner cathode circuit pattern 25a of the bottom wall 31 of the case main body 3.

Further, the anode lead 11 of the capacitor element 1 is electrically and mechanically connected to the bolster member 22, and the anode lead 11 is electrically connected to the inner anode circuit pattern 21a via the bolster member 22.

An upper lid 35 is attached to the upper opening section of the case main body 3 accommodating the capacitor element 1. In this state, the peripheral edge section on the lower side (inner surface side) of the upper lid 35 and the upper end face of the peripheral side wall 32 of the case main body 3 are adhered by an adhesive agent, and the upper surface of the capacitor element 1 and the inner surface of the upper lid 35 are adhesively fixed via an adhesive agent 5 filled in between the cathode part 10 of the upper surface of the capacitor element 1 and the inner surface (lower surface) of the upper lid 35.

The adhesive agent 5 may be applied to at least a part of the upper surface of the capacitor element 1, preferably applied to the entire upper surface of the capacitor element 1 to adhere the entire upper surface to the upper lid 35. Concretely, it is preferable that 90% or more of the region on the upper surface of the capacitor element 1 is connected to the upper lid 35 by the adhesive agent 5. That is, as the adhesion area of the capacitor element 1 to the upper lid 35 increases, the upper lid 35 can be attached in a stable manner, which can more assuredly prevent thermal deformation of the upper lid 35.

Figure 4:
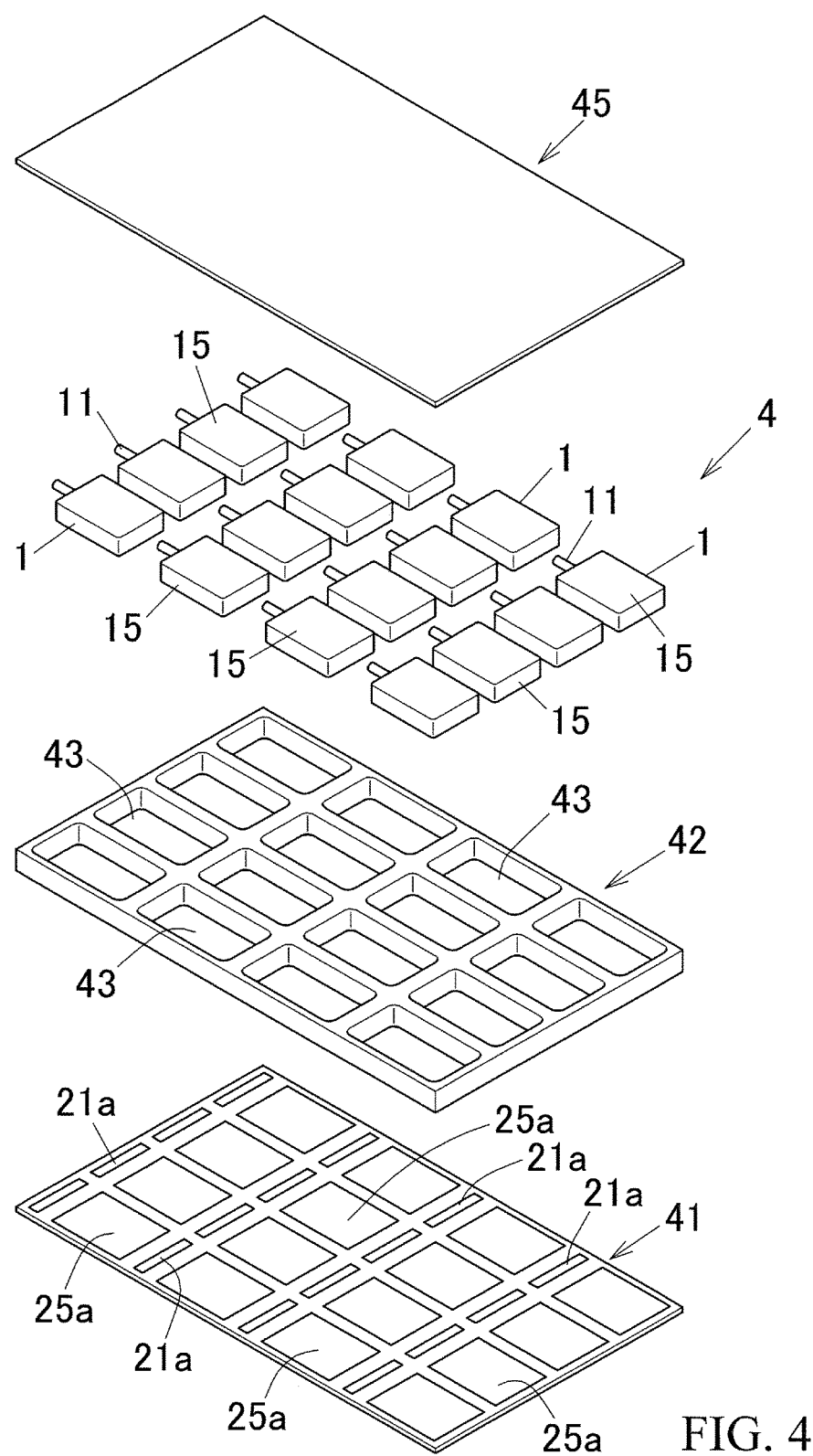
FIG. 4 is an exploded perspective view showing a capacitor continuous member which is an intermediate product according to the production method of the embodiment of the present invention.
Figure 5:
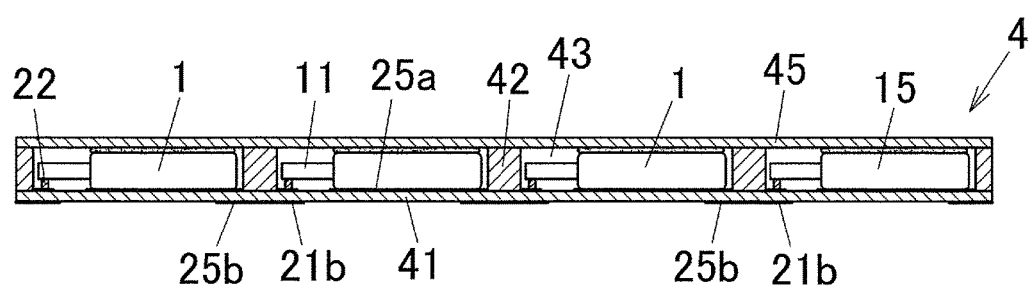
FIG. 5 is a side cross-sectional view showing a capacitor continuous member of the embodiment.

FIG. 4 is an exploded perspective view showing a capacitor continuous member 4 to be obtained as an intermediate product by a production method of this embodiment. FIG. 5 is a side cross-sectional view showing the capacitor continuous member 4.

As shown in both figures, in the production method of this embodiment, a capacitor continuous member 4 in which capacitor structural portions each capable of constituting a solid electrolytic capacitor are continuously arranged front and back, left and right (longitudinally and laterally) is produced, and a number of solid electrolytic capacitors are obtained at a time by dividing the capacitor continuous member 4 for each capacitor structural portion.

In the following explanation, the explanation will be made by exemplifying the case in which a total of sixteen pieces of solid electrolytic capacitors arranged in four longitudinal rows and four widthwise columns are produced simultaneously.

Figure 6A:
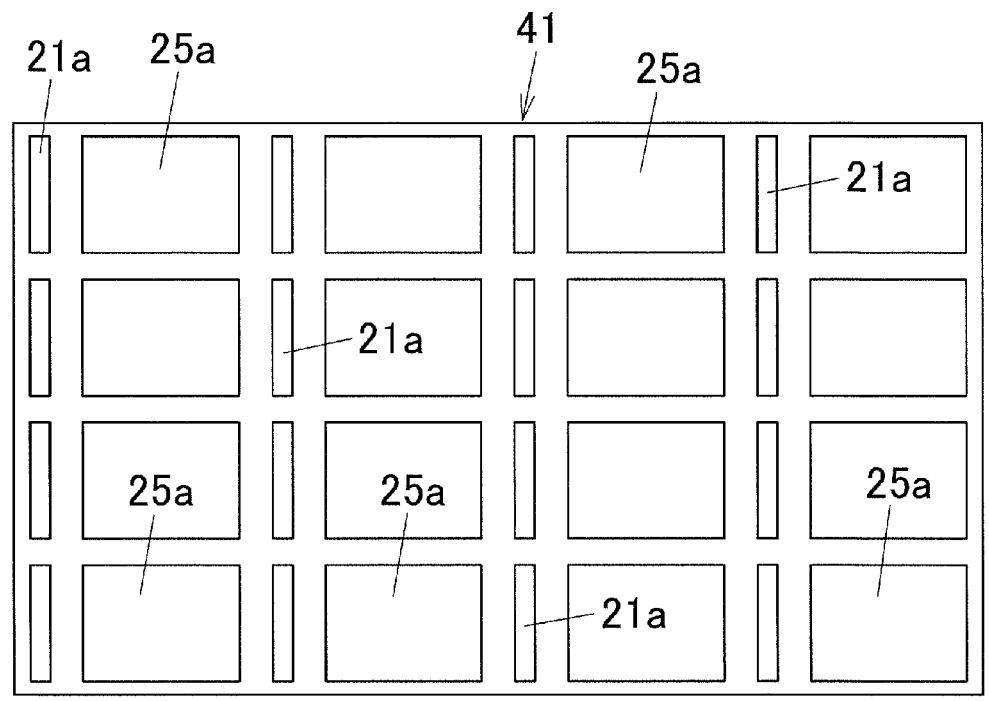
FIG. 6A is an inner view showing a bottom wall substrate used for the production method of the embodiment.
Figure 6B:
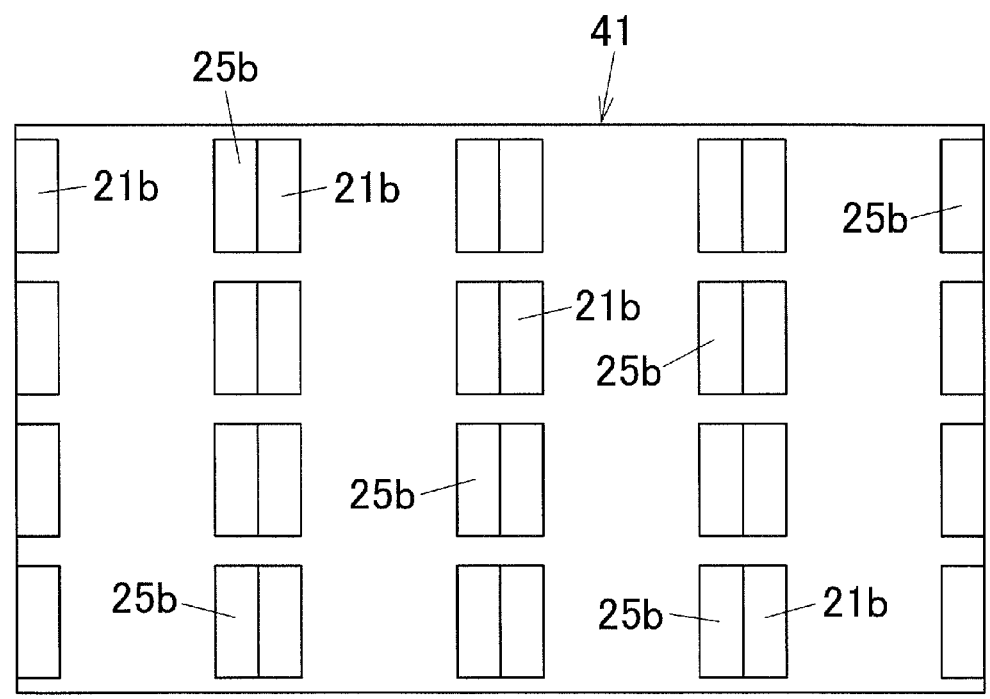
FIG. 6B is an outer view showing the bottom wall substrate used in the production method of the embodiment.

Initially, as shown in FIGS. 6A and 6B, a bottom wall substrate 41 constituting the bottom wall 31 of the solid electrolytic capacitor to be produced is prepared. For an easy understanding of the present invention, in this specification, the left side (left hand) is denoted as a "front side (forward side)," the right side (right hand)" is denoted as a "rear side (backward side)," the up-and-down direction is denoted as "up-and-down direction" when facing the plane of the paper of FIG. 5, and the up-and-down direction when facing the plane of the paper of FIG. 6A is denoted as "right and left direction (both side direction)."

This bottom wall substrate 41 is configured so as to be sectioned into a total of 16 regions (sectioned regions: regions sectioned by the broken lines in FIG. 10), i.e., four sections arranged in the longitudinal direction (right and left direction of FIG. 6A) which is a front-back direction (longitudinal direction) and four sectioned arranged in the transverse direction (up-and-down direction of FIG. 6A) which is a right and left direction (lateral direction), and each sectioned region constitutes a bottom wall structural portion which can constitute the bottom wall 31 of the solid electrolytic capacitor to be produced.

At the front end portion of each bottom wall structural portion (each sectioned region) on the upper surface (inner surface) of the bottom wall substrate 41, an inner anode circuit pattern 21a is formed, and at a region except for the front end portion of each bottom wall structural portion, an inner cathode circuit pattern 25a is formed.

Further, at the front end portion of each bottom wall structural portion on the lower surface (outer surface) of the bottom wall substrate 41, an outer anode circuit pattern 21b is formed, and at the rear end portion of each bottom wall structural portion, an outer cathode circuit pattern 25b is formed.

The inner anode circuit pattern 21a and the outer anode circuit pattern 21b corresponding between the inner side and outer side are made to be electrically connected via a through-hole (not illustrated) in which a conductive layer is formed on its inner peripheral surface. Further, the inner cathode circuit pattern 25a and the outer cathode circuit pattern 25b corresponding between the inner side and outer side are made to be electrically connected via the similar through-hole (not illustrated).

The through-hole is filled with resin, such as, e.g., epoxy resin, so that the height becomes equal to the thickness of the substrate 41. As each circuit pattern 21a, 21b, 25a and 25b, in many cases, copper is used, and circuit pattern forming regions as well as the through-holes are subjected to plate processing. As the plating, tin plating or gold flash plating of a nickel base can be exemplified as typical examples.

The plating to be subjected to the closed portion of the through-hole and the plating to be subjected to the circuit patterns 21a, 21b, 25a, and 25b are preferably adjusted to be the same in metallic type from the viewpoint of conductive property and also to be the same in tint from the viewpoint of appearance inspection.

In this embodiment, as the substrate 41, a substrate having a thickness of 1 mm or less, preferably 0.1 to 0.6 mm, is used. The dimension of the outer anode circuit patter 21b and that of the outer cathode circuit pattern 25b are set to be approximately the same. By setting so, when a produced box-shaped solid electrolytic capacitor is mounted to a circuit substrate and used, it becomes possible that the dimension can be matched to a dimension of a mounting substrate land pattern used for a conventional mold sealing type solid electrolytic capacitor. Therefore, the solid electrolytic capacitor produced by this embodiment can be applied to a conventional electric circuit substrate as it is.

As shown in FIG. 6B, on the back surface side (outer surface side) of the substrate 41, among bottom wall structural portions arranged adjacent in the longitudinal direction, the outer cathode circuit pattern 25b formed on the front side bottom wall structural portion and the outer anode circuit pattern 21b formed on the rear side bottom wall structural portion are formed continuously and electrically connected to each other.

Further, a bolster member 22 is attached to each inner anode circuit pattern 21a of the bottom wall substrate 41.

In this embodiment, as the bolster member 22, a member is used in which the length is the same as that of the inner anode circuit pattern 21a in the right and left direction. But, in the present invention, the length and/or shape of the bolster member 22 is not especially limited as long as it can be connected to the anode lead 11 of the capacitor element 1 to be accommodated. For example, the bolster member 22 may be a member shorter than the inner anode circuit pattern 21a, and may have a round cross-sectional shape, a polygonal cross-sectional shape such as a square cross-sectional shape, or a flattened cross-sectional shape formed by crushing a round or polygonal cross-sectional shape. Further, in the case of producing a capacitor in which two or more capacitor elements 1 are accommodated in a single box-shaped case 2, the bolster member 22 can be formed to have a size and a shape capable of being connected the anode leads 11 of the plurality of capacitor elements 1.

As the material of the bolster member 22, it is preferable to use a copper alloy such as low-resistance nickel silver. The connection between the bolster member 22 and the inner anode circuit pattern 21a can be performed by welding or using an electrical conducting material. Especially, in the case of using a cream solder, since the cream solder is low in resistance and can attain a planar two-dimensional connection, which is difficult to be attained by welding, it is preferable to use a cream solder. In the case of using a cream solder, a cream solder is applied to predetermined portions of the inner anode circuit pattern 21a by a dispenser or the like, and a bolster member 22 is arranged, and then the bolster member 22 is heated from the above to melt the cream solder, which results in an electrical and mechanical connection.

Figure 7A:
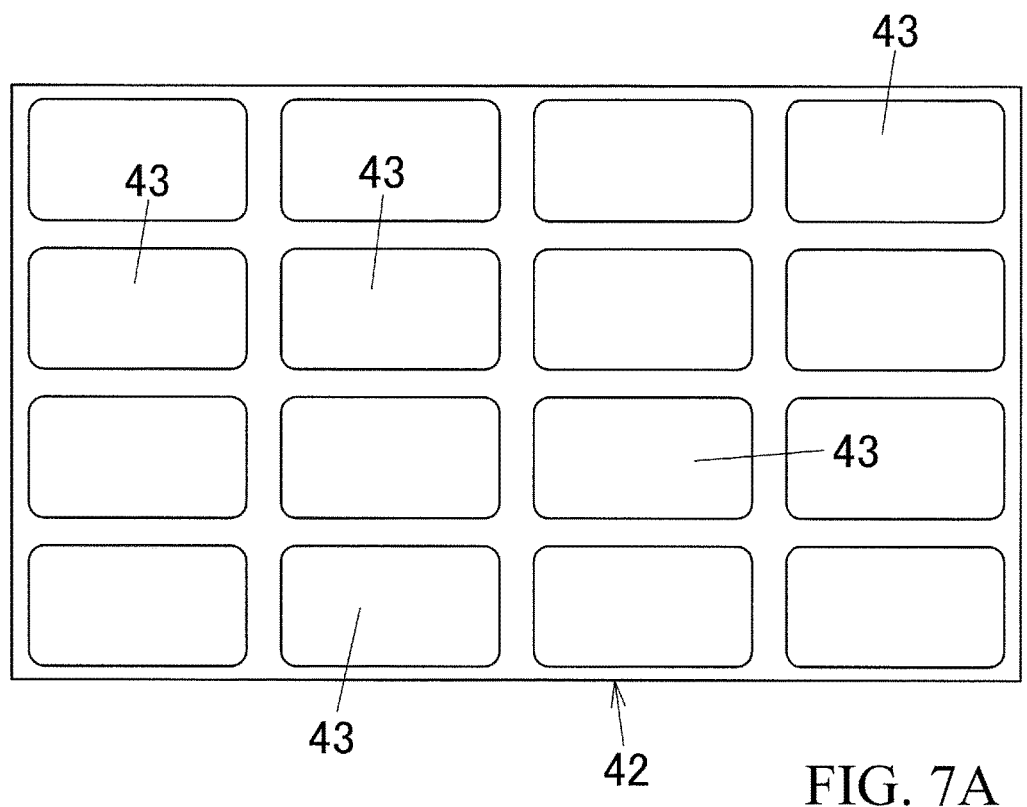
FIG. 7A is a top view showing a peripheral side wall substrate used in the production method of the embodiment.
Figure 7B:
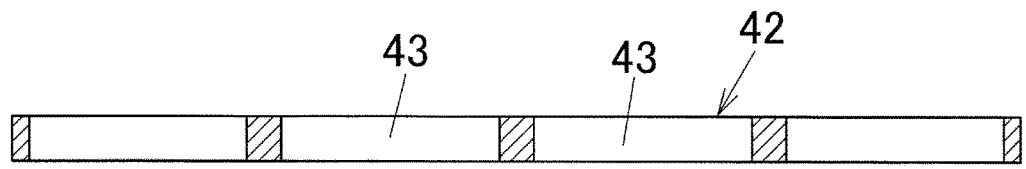
FIG. 7B is a side cross-sectional view showing a peripheral side wall substrate used in the production method of the embodiment.

As shown in FIGS. 7A and 7B, a peripheral side wall substrate 42 for constituting the peripheral side wall 32 of the solid electrolytic capacitor to be produced is attached to the bottom wall substrate 41 to which the bolster members 22 were attached.

The peripheral side wall substrate 42 is formed so that its longitudinal and widthwise dimensions are the same as those of the substrate 41. This peripheral side wall substrate 42 is provided with approximately rectangular (approximately square) through-holes 43 each formed corresponding to the inner cathode anode circuit patterns 21a and 25a of each bottom wall structural portion in the bottom wall substrate 41. The through-hole 43 has inner peripheral rounded corner portions.

As it will become apparent from the following explanation, the peripheral edge portion of each through-hole 43 of the peripheral side wall substrate 42 constitutes a portion capable of constituting the peripheral side wall 32 of a solid electrolytic capacitor.

This peripheral side wall substrate 42 is preferably a member made of thermo-setting resin such as, e.g., epoxy resin. As a production method of the through-hole 43, it is preferable to employ, for example, a method in which the though-hole 43 is formed by punching a thermo-setting resin flat plate with dies, and a method in which the through-hole 43 is formed by performing cutting work using a router.

Figure 8A:
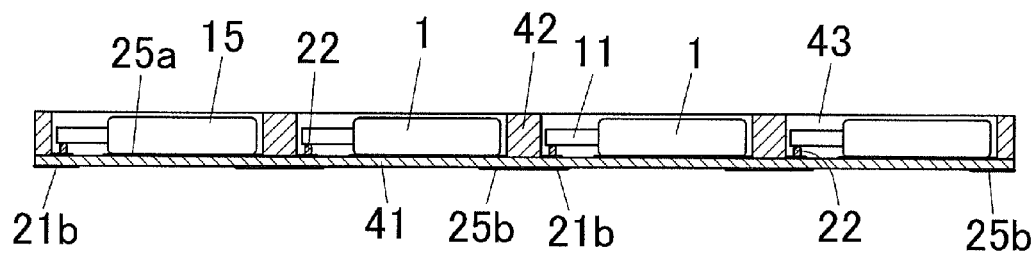
FIG. 8A is a side cross-sectional view showing the capacitor continuous member of the embodiment in which the upper lid substrate is removed.

The peripheral side wall substrate 42 is attached on the bottom wall substrate 41 so that each through-hole 43 of the peripheral side wall substrate 42 faces the inner anode circuit pattern 21a and the inner cathode circuit pattern 25a of each bottom wall structural portion on the bottom wall substrate 41 (see, e.g., FIG. 8A). In this state, each inner cathode anode circuit pattern 21a and 25a in each bottom wall structural portion is arranged in each through-hole 43.

The connection method of the peripheral side wall substrate 42 and the bottom wall substrate 41 can be a method of heating them under pressure using an adhesive agent, such as, e.g., epoxy resin.

With this, a case main body continuous member is formed, in which box-shaped concaved portions with upper ends opened each corresponding to a box-shaped case main body 3 are arranged four by four longitudinally and laterally.

In this case main body continuous member, as will be explained later, the capacitor element 1 is accommodated in the concave portion which is the through-hole 43. In this state, the dimension is set so that the upper end position of the peripheral side wall substrate 42 is higher than the upper end position of the capacitor element 1.

In a sealing method by box sealing, less stress will be applied to the capacitor element 1 as compared with resin mold sealing at the time of sealing. For this reason, box sealing can be preferably applied when sealing a capacitor element in which a brittle material (for example, tungsten) is used for an anode, etc.

The solid electrolytic capacitor element 1 used in this embodiment is produced as follows.

That is, the solid electrolytic capacitor element is produced by molding powder of valve action metal and/or conductive oxide of valve action metal with a metal lead wire made of valve action metal (anode lead 11) implanted and then sintered to thereby obtain an anode made of a sintered compact having a number of gaps therein. On the anode, a dielectric layer made of valve action metal oxide, a semiconductor layer, and a conductor layer are formed sequentially.

As the valve action metal and the conductive oxide of action metal, tantalum, aluminum, titanium, niobium, niobium oxide, tungsten, and alloy or composition thereof can be exemplified. Among them, it is preferable to use tungsten, an alloy of tungsten, or composition thereof capable of increasing a capacity of a capacitor. In the present invention, the alloy includes a reactant with nonmetal, solid solution, and partially alloyed tungsten.

The lead wire as the anode lead 11 may be connected to the sintered compact by welding, etc., later, instead of being implanted in the sintered compact. As the anode lead 11, tantalum and niobium are preferably used.

Further, the dielectric layer is normally formed on a fine pore surface and an outer surface of the anode, and a part of the anode lead 11 by an operation called "chemical conversion treatment" applying a voltage in an electrolyte. The dielectric layer is made of a metal oxide constituting the anode, and may sometimes include another element existing in the anode and/or a part of the electrolyte of the chemical conversion solution.

The material of the valve action metal, etc., used for the sintered body or the lead wire may include a small amount of impurities within a range that does not impair the capacitor characteristics.

For the semiconductor layer formed on the surface layer of the dielectric layer, a known layer can be used. Among other things, a semiconductor layer made of conductive polymer is preferable since the resistance is low. On the surface of the semiconductor layer formed on the anode outer layer except for the implanted surface of the anode lead 11, a conductive layer is formed to create the cathode part 10 as already mentioned.

Further, as a conductive layer, at least one of a carbon layer, a conductive paste layer and a plated layer is formed. Especially, a conductive layer in which a carbon layer and a silver paste layer are laminated alternately is preferably used.

Figure 8B:
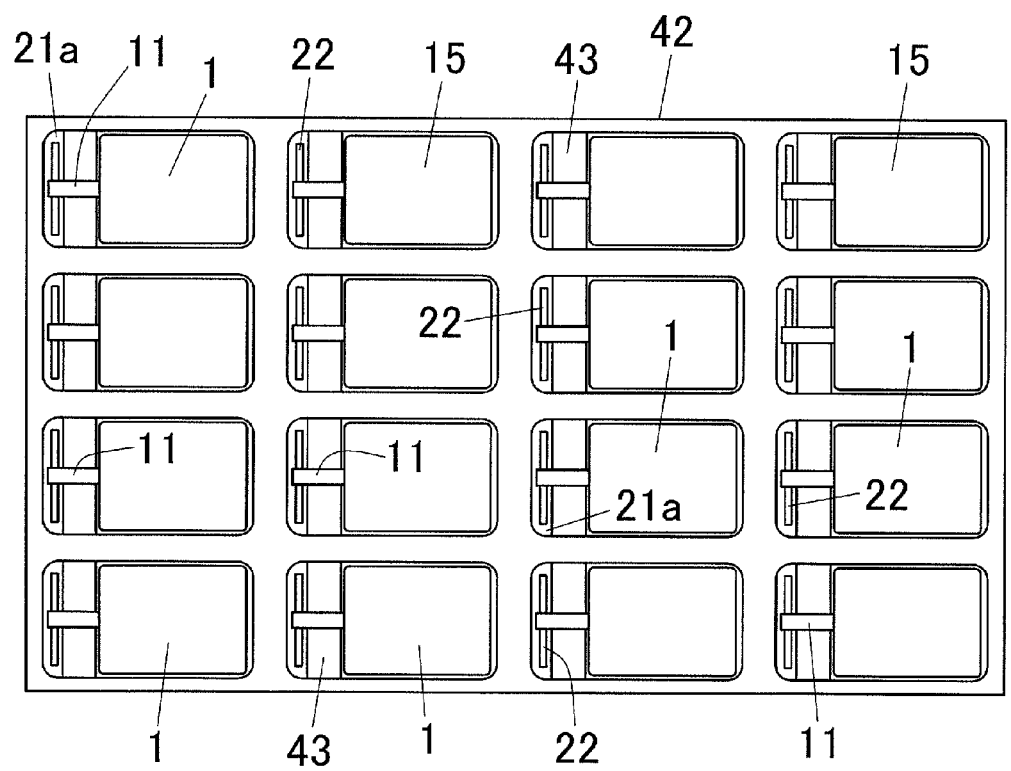
FIG. 8B is a top view showing the capacitor continuous member of the embodiment in a state in which the upper lid substrate is removed.

The capacitor element 1 structured as mentioned above is, as shown in FIGS. 8A and 8B, accommodated in each concave portion (through-hole 43) of the aforementioned case main body continuous member. In this case, if the anode lead 11 of the capacitor element 1 is longer, the anode lead 11 is cut into a predetermined length and then electrically and mechanically connected on the bolster member 22 by welding or using a conductive material. Further, the cathode part 10 of the capacitor element 1 is electrically and mechanically connected to the inner cathode circuit pattern 25a by a conductive material.

As an adhesive conductive material, conductive paste or solder can be used. Among them, silver paste is low in resistance and does not require a high temperature when used, and therefore it is preferable to use a silver paste.

There is a case in which a plurality of capacitor elements 1 are accommodated in each concave portion of the case main body continuous member. In such a case, a plurality of capacitor elements 1 are arranged in parallel side by side with the direction aligned.

Next, as shown in FIG. 4 and FIG. 5, an upper lid substrate 45 is attached to the upper end face of the case main body continuous member in which the capacitor elements 1 are accommodated in respective concave portions (through-holes 43).

The upper lid substrate 45 is formed such that the longitudinal and widthwise dimensions are the same as the longitudinal and widthwise dimensions of the peripheral side wall substrate 42 and the bottom wall substrate 41.

Portions of the upper lid substrate 45 corresponding to each through-hole 43 and its peripheral edge portion of the peripheral side wall substrate 42 constitute an upper lid structural portion capable of structuring the upper lid 35.

As the material of the upper lid substrate 45, an insulating resin, such as, e.g., epoxy resin, can be used. The thickness is 1 mm or less, more preferably 0.1 to 0.6 mm.

Further, on each upper lid structural portion on the upper surface of the upper lid substrate 45, symbols, numbers, etc., identifying the capacitor element 1 may be printed by printing or laser processing.

As explained above, in a state in which the entire upper surface of the peripheral side wall substrate 42 is covered by the upper lid substrate 45, the upper lid substrate 45 is fixed to the upper end face of the peripheral side wall substrate 42 using an adhesive agent. At this time, by the adhesive agent applied to the upper end face of the peripheral side wall substrate 42, the outer peripheral edge portion of each upper lid structural portion of the upper lid substrate 45 is fixed. Further, by fixing at least a part of the cathode part 10 which is an upper surface of each capacitor element 1 to each upper lid structural portion of the upper lid substrate 45 by the adhesive agent 5, with the adhesive agent 5 filled in between the capacitor element 1 and the upper lid structural portion of the upper lid substrate 45, the upper surface of each capacitor element 1 and each upper lid structural portion of the upper lid substrate 45 are adhesively fixed via the adhesive agent 5.

Further, before attaching the upper lid substrate 45, an insulating low-thermal conductive filler can be filled in the space above the capacitor element 1 of each concave portion (each through-hole 43) to thereby provide a means for slowing the heat transfer from the outside. As the low-thermal conductive filer, silica, zirconia, and the like can be exemplified.

Thus, as shown in FIGS. 4 and 5, by attaching the upper lid substrate 45 to the case main body continuous member, the capacitor continuous member 4 in which solid electrolytic capacitor constructible portions are connected four by four longitudinally and laterally.

Before separating the capacitor continuous member into each capacitor structural portion, in a state in which the capacitor structural portions are connected, it is preferable to perform aging processing to each capacitor element 1.

Figure 9:
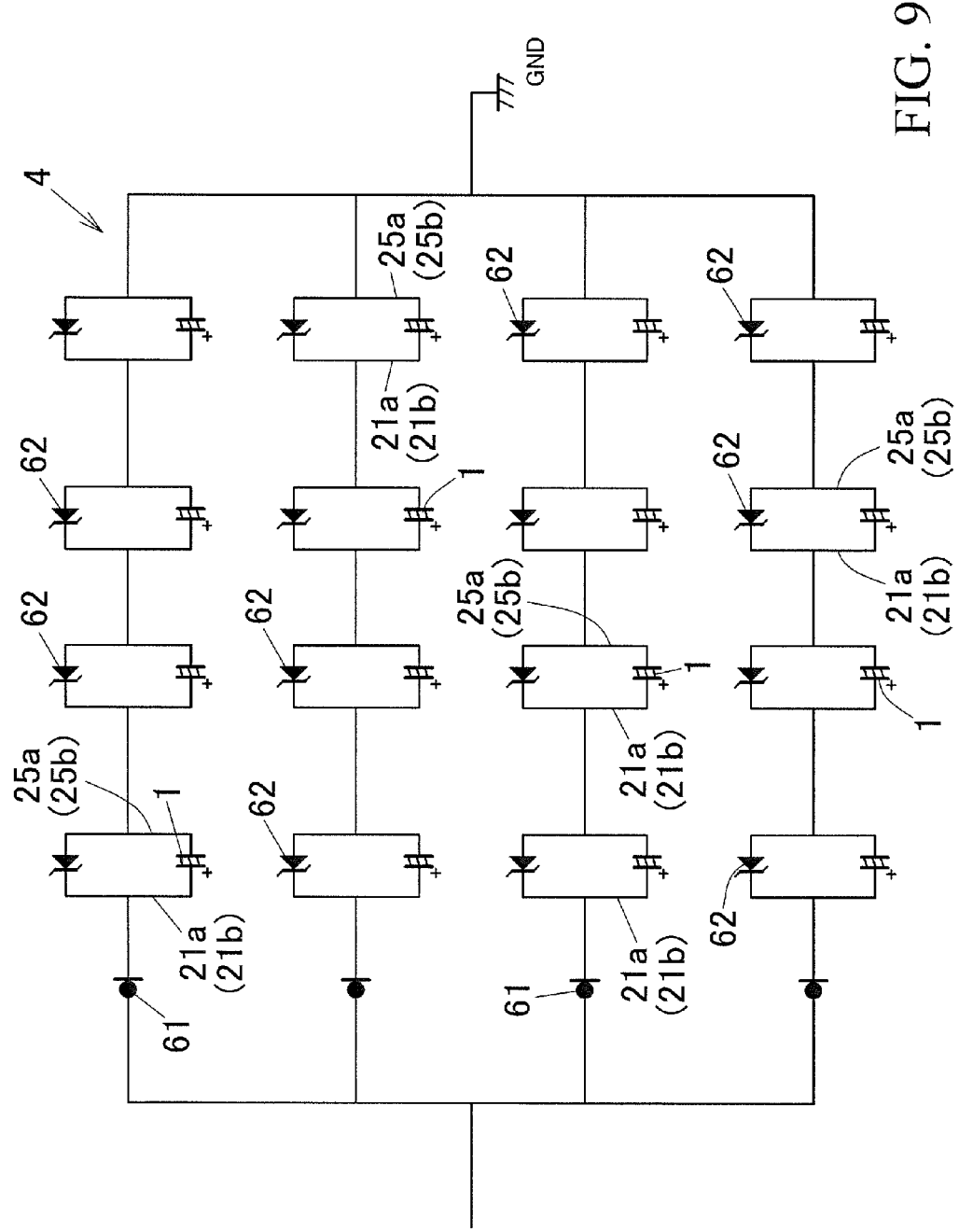
FIG. 9 is a block diagram showing an electric circuit structure of the capacitor continuous member at the time of aging processing in the production method of the embodiment.

In performing the aging processing, an electronic circuit shown in FIG. 9 is formed using the capacitor continuous member, and the four capacitor elements 1 arranged in the longitudinal direction (front-back direction) are energized in series. That is, in the capacitor structural portions arranged adjacently in the front-back direction, in a state in which the outer cathode circuit pattern 25b of the front side capacitor structural portion and the anode circuit pattern 21b of the rear side capacitor structural portion are electrically connected, a plurality of capacitor elements 1 arranged in the front-back direction (the longitudinal direction), an electric circuit is formed, in which a current is supplied from a power supply via a constant current element 61 to the outer anode circuit pattern 21b electrically connected to the anode lead 11 of the capacitor element 1 arranged at the most upstream side (front side) in each row to be connected in series, and the current is returned to the power source via a common conductive wire from the outer cathode circuit patterns 25b electrically connected to the cathode part 10 of the capacitor element 1 arranged at the most downstream side (rear side) in each row.

By using the constant current element 61 having an appropriate current value it becomes possible, for example, to prevent that a large current flows only through a specific capacitor element 1 and a current will not be supplied to another capacitor elements 1 when any one of capacitor elements 1 causes a short-circuit, which in turn can perform stable aging processing. As one example of the constant current element 61, a constant current diode (CRD) can be exemplified. In this embodiment, the constant current element 61 constitutes a current limiting means.

Further, in order to prevent that a specific capacitor element 1 causes short-circuit and the voltage is unnecessarily applied to another capacitor element 1, a voltage limiting circuit is structured in which the constant-voltage element 62 is arranged in parallel to each capacitor element 1. With this, the aging processing can be performed by connecting a plurality of elements 1 in series, and even if trouble occurs in any one of capacitor elements 1, the aging processing can be continued. As an example of the constant-voltage element constituting the voltage limiting circuit, a Zener diode can be exemplified. In this embodiment, the constant-voltage element 62 constitutes a voltage limiting means.

Here, in the capacitor continuous member 4 of this embodiment, in the capacitor structural portions arranged adjacently in the series direction, the outer cathode circuit pattern 25b of the capacitor structural portion arrange on the upstream side (left side in FIG. 5) and the outer anode circuit pattern 21b of the capacitor structural portion arranged on the downstream side (right side in FIG. 5) are formed continuously, and therefore the capacitor elements 1 arranged in the front-back direction are electrically connected in series from the beginning. For this reason, no wiring connection between the capacitor elements 1 arranged in the series direction is required, and therefore the aging processing can be performed easily.

The energizing voltage for the aging processing is set to be equal to or below the formation voltage at the time of producing the capacitor element 1. The environment temperature when being energized is set to 80 to 150° C., and the energizing time is set within several weeks. By performing such energizing processing (aging processing), the inner solid electrolytic capacitor element 1 can be stabilized.

After performing the aging processing, the capacitor continuous member 4 is cut longitudinally with respect to the surface of the substrate 41 and 45 along the boundary lines (broken lines shown in FIG. 10) between the capacitor structural portions to cut out every capacitor structural element to thereby obtain a box sealed type chip-like solid electrolytic capacitor as shown in FIGS. 1 and 2. The cutting method can be selected from, for example, router type cutting, dicer type cutting, or a wire saw cutting method.

A solid electrolytic capacitor to be produced is defined in size and shape every type. By setting the repetition pitch dimension of the cathode anode circuit patterns 21a, 21b, 25a, and 25b and the width dimension of the partition wall of the peripheral side wall substrate 42 so that the cutting position of the capacitor continuous member 4 is a width central position of the partition wall between the adjacent through-holes 43 of the partition side wall substrate 42, the number of cutting can be minimized, which in turn can facilitate the cutting operation or the capacitor producing operation.

In each separated solid electrolytic capacitor, the outer surface of the peripheral side wall 32, and cutting planes of the outer peripheral end faces of the bottom wall 31 and the upper lid 35 are subjected to a processing treatment as needed to remove defects, such as, e.g., scuffing, if any. As the processing method of the cutting plane, router processing or blast processing can be employed.

Further, in the case of performing blast processing, it is preferable to perform the blast processing after preparing a mask or a protection plate to prevent the plating of the outer cathode anode circuit patterns 21b and 25b on the rear side of the substrate from sloughing off therefrom or the marking of the upper lid 35 from being scraped off. Further, in cases where the marking of the upper lid 35 was performed by laser processing, since the marking scraping by the blast material is slight, it is preferable to employ a method in which blast processing of the solid electrolytic capacitor is performed without masking and after the blast processing, post plating is performed on the outer cathode anode circuit patterns 21b and 25b. This makes it possible to avoid having to use a mask.

As mentioned above, according to the production method of the solid electrolytic capacitor according to the present invention, after producing a capacitor continuous member 4 in which a plurality of capacitor structural portions capable of constituting the solid electrolytic capacitor are provided continuously, the capacitor continuous member 4 is divided into each capacitor structural portion to obtain the solid electrolytic capacitor. Therefore, a number of solid electrolytic capacitors can be produced at a time, which can improve the production efficiency.

According to the box sealed type solid electrolytic capacitor obtained by the production method of this embodiment, since the upper lid 35 is adhesively fixed to the upper surface of the capacitor element 1 via the adhesive agent 5, approximately the entire area of the upper lid 35 is supported by the capacitor element 1 and the case main body 3 in a stable manner. Therefore, in a state in which the solid electrolytic capacitor is mounted on an electronic circuit board, even if a high temperature is applied to the upper lid 35, it is possible to assuredly prevent defects, such as, e.g., denting or swelling of the upper lid 35.

Further, in this embodiment, in cases where a low-thermal conductive filler is added to the adhesive agent 5 to lower the thermal conductivity, the effect of the thermal stress to the capacitor element in the mounted state can be further suppressed. Therefore, the leak current of the capacitor element 1 will not be increased extremely, preventing the deterioration of the leak current characteristics, which in turn can obtain a capacitor having a higher performance.

In the aforementioned embodiment, the explanation was directed to the case in which a single capacitor element 1 is accommodated in the box-shaped case 2 one by one, but the present invention is not limited to it. A plurality of capacitor elements 1 can be accommodated in a single box-shaped case 2. For example, two capacitor elements are accommodated in a box-shaped case 2 (case main body 3) in parallel with pull-out directions of the anode leads aligned.

Further, in the aforementioned embodiment, after adhesively fixing the peripheral side wall substrate 42 to the bottom wall substrate 41, the capacitor element 1 is attached, but the present invention is not limited to it. In the present invention, after fixing the capacitor element 1 to the bottom wall substrate 41, the peripheral side wall substrate 42 can be adhesively fixed to the bottom wall substrate 41.

Further, in the aforementioned embodiment, the number of the capacitor structural portions forming the capacitor continuous member is set to a total of sixteen (16), arranged four by four longitudinally and laterally. But the present invention is not limited to it, and the number of capacitor structural portions forming the capacitor continuous member is not limited. Further, in the present invention, it is not required to provide a plurality of capacitor structural portions longitudinally and laterally. The present invention allows to produce a single row structural capacitor continuous member in which the number of capacitor structural portions arranged in at least one of the longitudinal direction and the lateral direction is set to one.

EXAMPLE

Hereinafter, examples related to the present invention will be explained in detail.

As a bottom wall substrate 41, a copper-clad glass epoxy substrate having a thickness of 0.3 mm, a length (vertical) dimension of 146 mm, and a width (lateral) dimension of 86 mm was prepared.

Figure 10A:
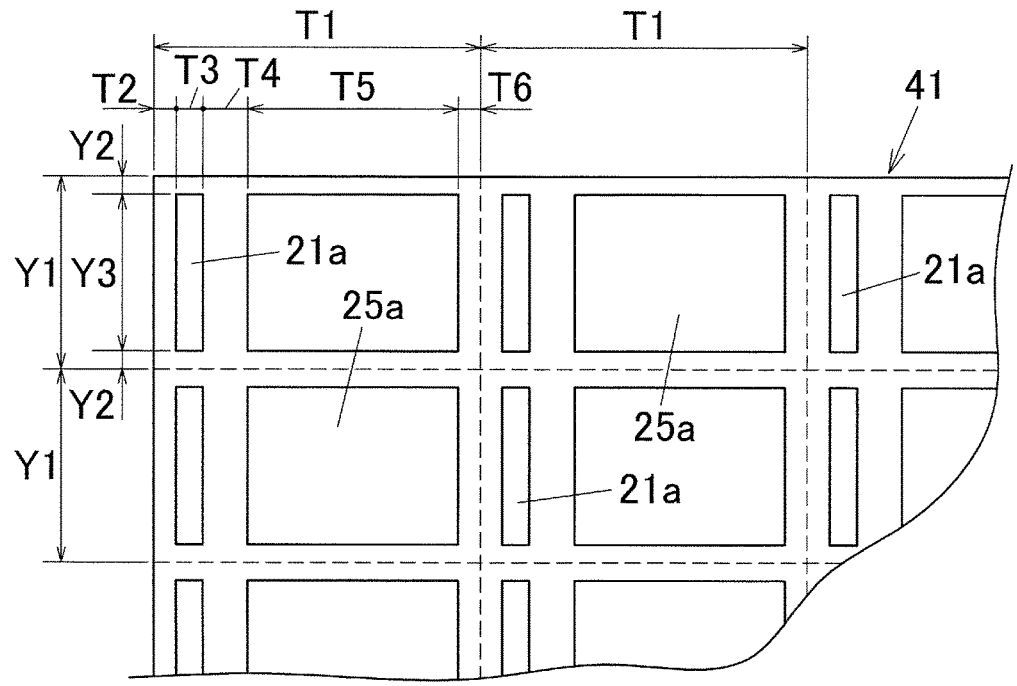
FIG. 10A is an inner view showing a bottom wall substrate used in the production method of an example according to the present invention.

As shown in FIG. 10A, the bottom wall substrate 41 was divided into twenty (20) sections longitudinally and laterally with a longitudinal direction pitch T1 of 7.3 mm and a lateral direction pitch Y1 of 4.3 mm to thereby obtain a total of four hundreds (400) sectioned regions. In FIG. 10A, each boundary line between the sectioned regions (bottom wall structural portions) is shown by a broken line.

Further, as shown in FIG. 10A, in each bottom wall structural portion on the surface side (inner surface side) of the bottom wall substrate 41, an inner anode circuit pattern 21a having a longitudinal dimension T3 of 0.6 mm and a lateral dimension (width dimension) Y3 of 3.5 mm was formed at the position away from the front end position by 0.5 mm (see, T2) and away from both side end positions by 0.4 mm (see Y2). Further, an inner cathode circuit pattern 25a having a longitudinal dimension T5 of 4.7 mm and a lateral dimension (width dimension) Y3 of 3.5 mm was formed at the position away rearward from the inner anode circuit pattern 21a by 1.0 mm (see, T4) and away from both side end positions by 0.4 mm (see Y2). The distance dimension T6 of the inner anode circuit pattern 25a from the rear end position in each bottom wall structural portion was 0.5 mm.

Figure 10B:
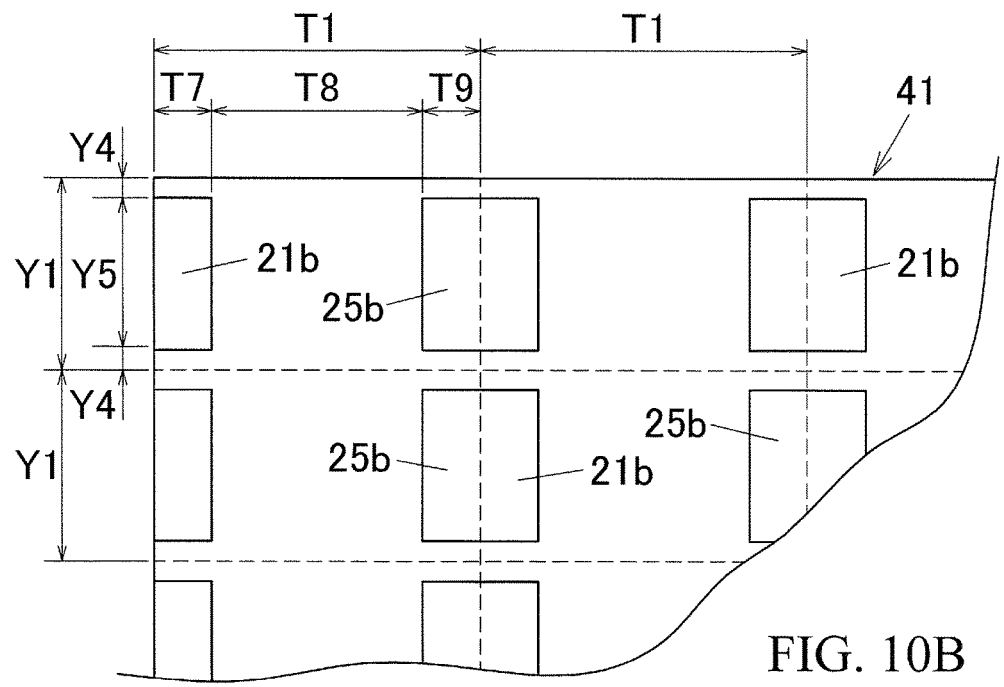
FIG. 10B is an outer view showing the bottom wall substrate used in the production method of the embodiment.

Further, as shown in FIG. 10B, in each bottom wall structural portion on the back surface side (outer surface side) of the bottom wall substrate 41, an outer anode circuit pattern 21b having a longitudinal dimension T7 of 1.3 mm and a lateral dimension (width dimension) Y5 of 3.4 mm was formed at the position not away from the front end position and away from both side end positions by 0.45 mm (see Y4). Further, an outer cathode circuit pattern 25b having a longitudinal dimension T9 of 1.3 mm and a lateral dimension Y5 of 3.4 mm was formed at the position not away from the rear end position and away from both side end positions by 0.45 mm (see Y4). The distance T8 between the outer anode circuit pattern 21b and the outer cathode circuit pattern 25b in each bottom wall structural portion was 4.7 mm. Further, among bottom wall structural portions adjacent in the longitudinal direction, the outer cathode circuit pattern 25b of the bottom wall structural portion arranged on the front side (left side in FIG. 10B) and the outer anode circuit pattern 21b of the bottom wall structural portion arranged on the front side (left side in FIG. 10) were connected and electrically connected.

In each bottom wall structural portion, the anode circuit patterns 21a and 21b and the cathode circuit patterns 25a and 25b corresponding between the front and rear surfaces were electrically connected via a through-hole, respectively. The through-hole was 0.5 mm in diameter, and the hole was filled with epoxy resin so that the thickness was set to be equal to the thickness of the bottom wall substrate 41.

Further, each circuit pattern 21a, 21b, 25a and 25b as well as the through-hole were subjected to a tin plating of nickel base portion.

Next, a bolster member 22 constituted by a nickel silver wire having a length of 3.0 mm and a diameter of 0.45 mm was connected to each inner anode circuit pattern 21a in each bottom wall structural portion in parallel to the lateral direction (widthwise direction) of the circuit pattern 21a. The connection position was set to the position away from the front end (left end in FIG. 10A) of the circuit pattern 21a by 0.375 mm and the position away from both side ends (upper and lower ends in FIG. 10A) of each anode circuit pattern 21a by 0.25 mm. The connection was performed by applying a cream solder SMX-H05 made by Senju Metal Industry Co., Ltd. under the nickel silver wire and heating from above the bolster member 22.

Next, as the material of the peripheral side wall substrate 42, a glass epoxy substrate having a thickness of 1.2 mm was prepared. The plane size was a length (longitudinal dimension) of 146 mm and a width (lateral dimension) of 86 mm which were the same as those of the bottom wall substrate 41. Except for the 0.5 mm wide portions of the glass epoxy substrate from the front and rear ends in the longitudinal direction (length direction) and the 0.4 mm portions of the glass epoxy substrate from the bot side ends in the lateral direction (width direction), a total of 400 rectangular through-holes 43 having a length (longitudinal dimension)

of 6.3 mm, and a width (lateral dimension) of 3.5 mm, i.e., 20 through-holes in the longitudinal direction and 20 through-holes in the lateral direction, were formed in the portions corresponding to the bottom wall structural portions of the bottom wall substrate 41 at equal intervals to thereby obtain a peripheral side wall substrate 42.

In this peripheral side wall substrate 42, the thickness of the partition wall between the through-holes 43 and 43 arranged in the longitudinal direction was 1.0 mm, and the thickness of the partition between the through-holes 43 and 43 arranged in the lateral direction was 0.8 mm.

The through-holes 43 were formed into the same shape as that of the peripheral side wall substrate using dies prepared separately. Defects such as, e.g., scuffing of the processed cross-section of the through-hole 43, were removed by router processing.

The lower end face of the peripheral side wall substrate 42 obtained as mentioned above was adhered to the front surface side (inner surface side) of the bottom wall substrate 41 via fiber-like material of "Prepregs 1661-HL" made by Panasonic Cooperation using epoxy-based adhesive agent at 185° C. by pressure bonding. Thus, a case main body continuous member in which a total of 400 box portions with its upper end opened (case main body structural portion) were arranged 20 by 20 longitudinally and laterally (see FIG. 8A and FIG. 8B).

In the through-holes 43 of this case main body continuous member, the inner circuit patterns 21a and 25a formed on the surface of the bottom wall substrate 41 are arranged, respectively.

Separately from the production work of the case main body continuous member, capacitor elements 1 were prepared.

That is, powder in which a commercially available 0.3 mass % silicon powder having a volume mean particle diameter of 0.8 μm (distribution: 0.1 to 8 μm, 5 μm or larger: 7 mass %) was added to tungsten powder having a volume mean particle diameter of 0.3 μm (0.1 to 8 μm, specific surface area of 6.3 m2/g) obtained by hydrogen reduction of tungsten trioxide was left under high vacuum at a temperature of 1,280° C. for 30 minutes. Thereafter, the temperature was lowered to a room temperature, and the block object was crushed to obtain granulated powder having a volume mean particle diameter of 52 μm (powder of less than 180 μm, a specific surface area of 2.2 m2/g, a bulk density of 2.6 g/cm3, a tap density of 5.1 g/cm3, CV of 160,000/g). After implanting the tantalum wire (anode lead 11) having a diameter of 0.29 mm in the powder and then molding, sintering was performed under high vacuum at a temperature of 1,330° C. for 20 minutes, to thereby produce 2,000 sintered bodies (powder mass of 118 mg, specific surface area of 1.1 m2/g) having a dimension of 1.0 mm×3.0 mm×4.45 mm. In this sintered body, at the center of the face (front surface) of 1.0 mm×3.0 mm, the tantalum wire (anode lead 11) was implanted with buried inside by 3.7 mm and pulled outside by 6.0 mm.

Then, the sintered body was subjected to a chemical conversion treatment as an anode in 3 mass % of potassium persulfate solution at 45° C. by 10 V for 6 hours and then rinsed in water, then cleaned with ethanol. Immediately after, it was left at 190° C. for 30 minutes and then returned to a room temperature to thereby form a dielectric layer at the anode and a part of the lead wire.

Further, on a semiconductor layer of conductive polymer in which anthraquinone sulfonic acid was doped to ethylenedioxythiophene polymer on the dielectric layer, a carbon layer and a silver layer were laminated in this order. Thus, 640 pieces of tungsten solid electrolytic capacitor elements 1 were formed. On the 1.0 mm×3.0 mm surface (front surface) of the sintered body in which the anode lead 11 was implanted and the anode lead 11, no carbon layer and silver layer were formed.

Among the solid electrolytic capacitor elements 1 produced as mentioned above, any 400 pieces of solid electrolytic capacitor elements were arbitrarily selected and each anode lead 11 was cut at the position away from the tip end by 4.7 m. Each solid electrolytic capacitor element 1 was accommodated in each box portion (through-hole 43) of each of the 400 case main body continuous members. At this time, the cathode part 10 of the capacitor element 1 constituted by a surface (lower surface) having a sintered body dimension of 3.0 mm×4.45 mm was arranged on the inner cathode circuit pattern 25a and electrically and mechanically connected thereto using a silver paste, and the anode lead 11 of the capacitor element 1 is arranged so as to be perpendicular to the nickel silver wire as a bolster member 22 and electrically and mechanically connected the nickel silver wire by resistance welding.

Subsequently, epoxy-based adhesive agent 5 was applied to the entire upper end face of the peripheral side wall substrate 42 and the cathode part 10 constituted by the upper surface of the capacitor element 1, and an upper lid substrate 45 made of a separately prepared glass epoxy plate having a thickness of 0.3 mm, a length (longitudinal dimension) of 146 mm, and a width (lateral dimension) of 86 mm was connected and hardened.

Thus, a capacitor continuous member 4 (see FIG. 4 and FIG. 5) in which capacitor structural portions capable of constituting a total of 400 pieces solid electrolytic capacitors arranged 20 by 20 longitudinally and laterally were provided continuously was produced.

Next, in the same manner as in the aforementioned embodiment, aging processing was performed to each capacitor element 1 of the capacitor continuous member 4.

That is, a power source having detachable wiring fixtures was connected to 400 pieces of outer anode circuit patterns 21b and 400 pieces of outer cathode circuit patterns 25b on the rear surface of the substrate, a voltage of 7V was applied from the power source to the plurality of capacitor elements 1 of each raw arranged in series in the environment of 105° C. for 24 hours to stabilize each solid electrolytic capacitor element 1. A constant current diode (CRD) "Product No. E701" made by SEMITEC Corporation was arranged in the wiring extending from the power source to each outer anode circuit pattern 21b to regulate the current value. Further, for the voltage control, Zener diodes each having a Zener voltage of 7 V selected from Zener diodes of "Product Number: DF2S6.8SC" made by Toshiba Semiconductor Corporation were used.

After performing the aging processing, the capacitor continuous member 4 was cut vertically with respect to the flat surface (upper surface) of the upper lid substrate 45 at the intermediate portion of each partition wall of the peripheral side wall substrate 42 to thereby obtain 400 pieces of separated box sealed type chip-like solid electrolytic capacitors. This cutting processing was performed using a "Wire Saw MWN442DM" made by Komatsu NTC Ltd.

The solid electrolytic capacitor produced as mentioned above had a capacity of 1,500 μF and a rated voltage of 2.5V.

This application claims priority to Japanese Patent Application No. 2013-119555 filed on Jun. 6, 2013, and the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

INDUSTRIAL APPLICABILITY

The production method of the solid electrolytic capacitor of the present invention can be applicable in producing a box sealed type solid electrolytic capacitor.

EXPLANATION OF SYMBOLS

1: capacitor element
10: cathode part
11: anode lead (anode part)
2: box-shaped case
21a: inner anode circuit pattern
21b: outer anode circuit pattern
22: bolster member
25a: inner cathode circuit pattern
25b: outer cathode circuit pattern
31: bottom wall
32: peripheral side wall
35: upper lid
4: capacitor continuous member
41: bottom wall substrate
42: member for the peripheral wall
43: through-hole
45: upper lid substrate
5: adhesive agent
61: constant current element (current control means)
62: constant voltage diode (voltage control means)

The invention claimed is:

1. A production method of a solid electrolytic capacitor for producing a box sealed type solid electrolytic capacitor equipped with a box-shaped case in which a peripheral side wall is formed upright on an outer peripheral edge portion of an inner surface of a bottom wall and an upper opening section of the peripheral side wall is closed by an upper lid, and a capacitor element accommodated inside the box-shaped case, the method comprising:

a step of preparing a bottom wall substrate in which a plurality of bottom wall structural portions capable of constituting the bottom wall are provided continuously;

a step of forming inner cathode anode circuit patterns and outer cathode anode circuit patterns on an inner surface and an outer surface of each bottom wall structural portion of the bottom wall substrate, respectively, and electrically connecting the inner cathode anode circuit patterns and the outer cathode anode circuit patterns;

a step of preparing a peripheral side wall substrate provided with a plurality of through-holes in an arrangement corresponding to the plurality of bottom wall structural portions;

a step of attaching the peripheral side wall substrate to an inner surface of the bottom wall substrate so that the inner cathode anode circuit patterns of each bottom wall structural portion of the bottom wall substrate are respectively arranged in each through-hole of the peripheral side wall substrate;

a step of preparing, as the capacitor element, a capacitor element in which an anode part is constituted by an anode lead protruded from a front end forward and a cathode part is provided on at least lower surface;

a step of fixing the capacitor element to an inner surface of each bottom wall structural portion of the bottom wall substrate and electrically connecting cathode anode parts of each capacitor element to the inner cathode anode circuit patterns of each bottom wall structural portion;

a step of obtaining a capacitor continuous member in which a plurality of capacitor structural portions capable of constituting the solid electrolytic capacitor are provided continuously by attaching an upper lid substrate on the peripheral side wall substrate so as to close the upper opening section of each through-hole of the peripheral side wall substrate; and a step of obtaining a plurality of solid electrolytic capacitors by cutting the capacitor continuous member every each capacitor structural portion.

2. The production method of a solid electrolytic capacitor as recited in claim 1, wherein, in connecting an anode lead of the capacitor element to an inner anode circuit pattern, a conductive bolster member is previously attached to the inner anode circuit pattern and then the anode lead of the capacitor element is connected to the bolster member.

3. The production method of a solid electrolytic capacitor as recited in claim 1,
wherein in attaching the upper lid substrate to the peripheral side wall substrate, an adhesive agent is previously applied to an upper surface of the capacitor element or a lower surface of the upper lid substrate, and then the adhesive agent is filled in between the upper lid substrate and the capacitor element.

4. The production method of a solid electrolytic capacitor as recited in claim 1,
wherein, as the capacitor element, a capacitor element using tungsten for an anode is used.

5. The production method of a solid electrolytic capacitor as recited in claim 1, further comprising a step of performing aging processing to each capacitor element of the capacitor continuous member,
wherein the aging processing is performed by connecting an outer cathode circuit pattern of a front side capacitor structural portion and an outer anode circuit pattern of a rear side capacitor structural portion in capacitor structural portions adjacent in a front and back direction, and energizing a plurality of capacitor elements arranged in the front and back direction in series by supplying current from a power source to the outer anode circuit pattern of a front end capacitor structural portion among a plurality of capacitor structural portions arranged in the front and back direction and returning the current from an outer cathode circuit pattern of a rear end capacitor element to the power source, and
wherein one current controlling current control means is provided to a plurality of capacitor elements arranged in series and a voltage controlling voltage control means is provided to each capacitor element.

6. The production method of a solid electrolytic capacitor as recited in claim 5,
wherein, in forming outer cathode anode circuit patterns on the bottom wall substrate, an outer cathode circuit pattern of a front side capacitor structural portion and an outer anode circuit pattern of a rear side capacitor structural portion, among capacitor structural portions of the capacitor continuous member adjacent in the front and rear direction, are formed continuously.

7. The production method of a solid electrolytic capacitor as recited in claim 1,
wherein, in connecting an anode lead of the capacitor element to an inner anode circuit pattern, a conductive bolster member is previously attached to the inner anode circuit pattern and then the anode lead of the capacitor element is connected to the bolster member, and
wherein, in attaching the upper lid substrate to the peripheral side wall substrate, an adhesive agent is previously applied to an upper surface of the capacitor element of a lower surface of the upper lid substrate, and then the adhesive agent is filled in between the upper lid substrate and the capacitor element.

* * * * *